(12) United States Patent
Lin

(10) Patent No.: US 11,606,636 B2
(45) Date of Patent: Mar. 14, 2023

(54) SOMATOSENSORY VIBRATION GENERATING DEVICE AND METHOD FOR FORMING SOMATOSENSORY VIBRATION

(71) Applicant: Feng-Chou Lin, New Taipei (TW)

(72) Inventor: Feng-Chou Lin, New Taipei (TW)

( * ) Notice: Subject to any disclaimer, the term of this patent is extended or adjusted under 35 U.S.C. 154(b) by 112 days.

(21) Appl. No.: 17/338,417

(22) Filed: Jun. 3, 2021

(65) Prior Publication Data

US 2022/0392318 A1    Dec. 8, 2022

(51) Int. Cl.
*H04R 1/08* (2006.01)
*G10L 21/06* (2013.01)

(52) U.S. Cl.
CPC .............. *H04R 1/08* (2013.01); *G10L 21/06* (2013.01); *H04R 2201/003* (2013.01)

(58) Field of Classification Search
CPC ........................................................ H04R 1/08
See application file for complete search history.

(56) References Cited

U.S. PATENT DOCUMENTS

| | | | | |
|---|---|---|---|---|
| 4,982,432 A * | 1/1991 | Clark | ...................... | A61F 11/04 340/407.1 |
| 5,388,992 A * | 2/1995 | Franklin | .............. | G09B 21/003 340/407.1 |
| 6,710,706 B1 * | 3/2004 | Withington | ............. | B63C 11/26 340/407.1 |
| 7,656,388 B2 * | 2/2010 | Schena | ................... | G06F 3/016 715/702 |
| 7,911,328 B2 * | 3/2011 | Luden | .............. | H04N 21/43074 340/407.1 |
| 7,979,146 B2 * | 7/2011 | Ullrich | .................... | G06F 3/016 340/407.1 |
| 8,000,825 B2 * | 8/2011 | Ullrich | .................... | G06F 3/016 340/407.1 |
| 8,169,402 B2 * | 5/2012 | Shahoian | ................ | G06F 3/016 345/161 |
| 8,308,558 B2 * | 11/2012 | Thorner | .................. | G06F 3/016 463/47 |
| 8,378,964 B2 * | 2/2013 | Ullrich | ..................... | G06F 3/16 84/645 |
| 8,995,692 B2 * | 3/2015 | Efrati | ..................... | H02K 35/02 381/364 |
| 9,461,529 B2 * | 10/2016 | Efrati | ..................... | H02K 33/16 |
| 9,947,188 B2 * | 4/2018 | Cruz-Hernandez | ..... | G06F 3/016 |

(Continued)

*Primary Examiner* — Travis R Hunnings
(74) *Attorney, Agent, or Firm* — Che-Yang Chen; Law Office of Michael Chen

(57) ABSTRACT

The invention provides a somatosensory vibration generating device comprising: an audio signal receiving module for receiving sound waves of external environmental sounds and converting the sound waves into a first audio frequency signal; a digital-to-analog conversion module for performing digital-to-analog conversion on the first audio frequency signal to generate and output a second audio frequency signal after digital-to-analog conversion; a digital signal processing module for converting the second audio frequency signal output by the digital-to-analog conversion module into a first vibration signal; an operational amplifier for performing gain processing on the first vibration signal and outputting a second vibration signal after gain processing; and at least one tactile transducer at least comprising a vibration element and a tactile transducer; and a frequency of the second audio frequency signal is less than 200 Hz.

10 Claims, 6 Drawing Sheets

(56) References Cited

U.S. PATENT DOCUMENTS

| | | | |
|---|---|---|---|
| 10,109,163 B2 * | 10/2018 | Li | G08B 6/00 |
| 10,122,310 B2 * | 11/2018 | Li | H02K 33/04 |
| 10,152,296 B2 * | 12/2018 | Trestain | H04R 3/04 |
| 10,921,892 B2 * | 2/2021 | Khwaja | H04R 3/12 |
| 11,344,722 B2 * | 5/2022 | Wong | A61N 1/0492 |
| 2022/0311976 A1 * | 9/2022 | Takahashi | H04R 1/08 |

* cited by examiner

SOMATOSENSORY VIBRATION GENERATING DEVICE AND METHOD FOR FORMING SOMATOSENSORY VIBRATION

BACKGROUND OF THE INVENTION

Field of Invention

The invention relates to a somatosensory vibration generating device and a method for forming somatosensory vibration, and more particularly to a somatosensory vibration generating device and a method for forming somatosensory vibration capable of generating a somatosensory vibration in synchronization with external environmental sounds.

Related Art

With the advancement of science and technology, when people are watching modern movies or playing highly visual games, large-sized displays and audio equipment can provide narrative images and rich sound and light effects, so that viewers or players can obtain pleasant experience visually and acoustically to fully achieve an efficacy of regulating the body and mind, or when people are listening to music, through special devices they can feel the frequency vibration of the music and resonate with the music.

Therefore, how to make a device that can enable the human body feel the frequency vibration while listening to music is a problem that the technicians in the field want to solve.

SUMMARY OF THE INVENTION

In view of the above-mentioned problem, an audio signal processing device, a somatosensory vibration generating device and a method for forming somatosensory vibration provided by the invention are capable of allowing users to collect peripheral audio frequency signals through a built-in microphone, or to receive audio frequency signals from mobile phones, tablet computers, or other mobile devices and fixed devices through wireless or wired transmission methods, the signals are converted from digital to analog and amplified through a volume/amplitude intensity adjustment module on a main control circuit board, and then transmitted to a tactile transducer to be capable of sending out a somatosensory vibration in synchronization with external environmental sounds and with output characteristics of dual-track, multi-track and vibrating track.

That is, according to an embodied configuration of the invention, a somatosensory vibration generating device can be provided, which comprises: an audio signal receiving module that receives sound waves of external environmental sounds and converts the sound waves into a first audio frequency signal; a digital-to-analog conversion module electrically connected to the audio signal receiving module and used for performing digital-to-analog conversion on the first audio frequency signal to generate and output a second audio frequency signal after digital-to-analog conversion; a digital signal processing module electrically connected to the digital-to-analog conversion module and used for converting the second audio frequency signal output by the digital-to-analog conversion module into a first vibration signal; an operational amplifier electrically connected to the digital signal processing module and used for performing gain processing on the first vibration signal and outputting a second vibration signal after gain processing; and at least one tactile transducer electrically connected to the operational amplifier and at least comprising a vibration element and a tactile transducer; wherein the vibration element is used for receiving the second vibration signal and causing the vibrating element to generate a somatosensory vibration in synchronization with external environmental sounds according to the second vibration signal.

Furthermore, according to another embodied configuration of the invention, a somatosensory vibration generating device can be provided, wherein the digital signal processing module performs digital-to-analog conversion on the first audio frequency signal by Fourier series arithmetic processing to remove harmonics higher than third-order and highlight dominant waves.

Furthermore, according to another embodied configuration of the invention, a somatosensory vibration generating device can be provided, wherein a frequency of the second audio frequency signal is intercepted in a frequency band below 200 Hz.

Furthermore, according to another embodied configuration of the invention, a somatosensory vibration generating device can be provided, which further comprises a volume/amplitude intensity adjustment module electrically connected to the digital signal processing module and used for adjusting audio signals of the volume/amplitude intensity adjustment module.

Furthermore, according to another embodied configuration of the invention, a somatosensory vibration generating device can be provided, which further comprises a wave filter module electrically connected to the digital-to-analog conversion module, the wave filter module comprises at least one low-pass filter, and at least one signal amplifier or at least one equalizer (EQ).

Furthermore, according to another embodied configuration of the invention, a somatosensory vibration generating device can be provided, which further comprises a wave filter module electrically connected to the digital-to-analog conversion module, the wave filter module sequentially comprises a first low-pass filter, a first signal amplifier, a second low-pass filter, and a second signal amplifier or at least one equalizer (EQ).

Furthermore, according to another embodiment of the invention, a somatosensory vibration generating device can be provided, wherein the audio signal receiving module, the digital-to-analog conversion module, the operational amplifier, and the volume/amplitude intensity adjustment module are separately disposed or integratively disposed on a main control circuit board.

Furthermore, according to another embodied configuration of the invention, a somatosensory vibration generating device can be provided, which further comprises a Bluetooth transmitter module for wirelessly outputting audio frequency signals to earphones.

Furthermore, according to another embodied configuration of the invention, a somatosensory vibration generating device can be provided, which further comprises a wearing part for disposing the audio signal receiving module, the digital-to-analog conversion module, the operational amplifier, the vibration element, the volume/amplitude intensity adjustment module and the at least one tactile transducer, and being suitable to wear on a human body.

Furthermore, according to another embodied configuration of the invention, a somatosensory vibration generating device can be provided, which further comprises a vibration control signal for controlling and determining an intensity and a frequency of the tactile transducer generating vibration.

Furthermore, according to other embodied configurations of the invention, a somatosensory vibration generating device can also be provided, wherein the audio signal receiving module further comprises any form of wired or wireless input source, for example, can be at least one selected from MEMS microphone, MEMS microphone array and capacitive microphone, but it is not limited thereto.

Furthermore, according to other embodied configurations of the invention, a somatosensory vibration generating device can also be provided, which further comprises a Bluetooth transmitter module for wirelessly outputting audio frequency signals to speakers, Bluetooth headphones and Bluetooth audio equipment.

Furthermore, according to yet another embodied configuration of the invention, a method for forming somatosensory vibration can further be provided, which comprises: using an audio signal receiving module to receive sound waves from an external environment to generate a first audio frequency signal and transmitting the first audio frequency signal to a digital-to-analog conversion module; performing digital-to-analog conversion on the first audio frequency signal with the digital-to-analog conversion module to generate a second audio frequency signal after digital-to-analog conversion, and outputting the second audio frequency signal to a digital signal processing module; converting the second audio frequency signal into a first vibration signal through the digital signal processing module, and outputting the first audio frequency signal to an operational amplifier; performing gain processing on the first vibration signal through the operational amplifier to obtain a second vibration signal after gain processing, and transmitting the second vibration signal to a tactile transducer; and according to the received second vibration signal the tactile transducer generating a somatosensory vibration in synchronization with external environmental sounds based on a time signal.

Furthermore, according to another embodied configuration of the invention, a method for forming somatosensory vibration can further be provided, wherein the digital signal processing module performs digital-to-analog conversion on the first audio frequency signal by Fourier series arithmetic processing to remove harmonics higher than third-order and highlight dominant waves.

Furthermore, according to another embodied configuration of the invention, a method for forming somatosensory vibration can further be provided, wherein a frequency of the second audio frequency signal is intercepted in a frequency band below 200 Hz.

DETAILED DESCRIPTION OF THE INVENTION

Figure 1:
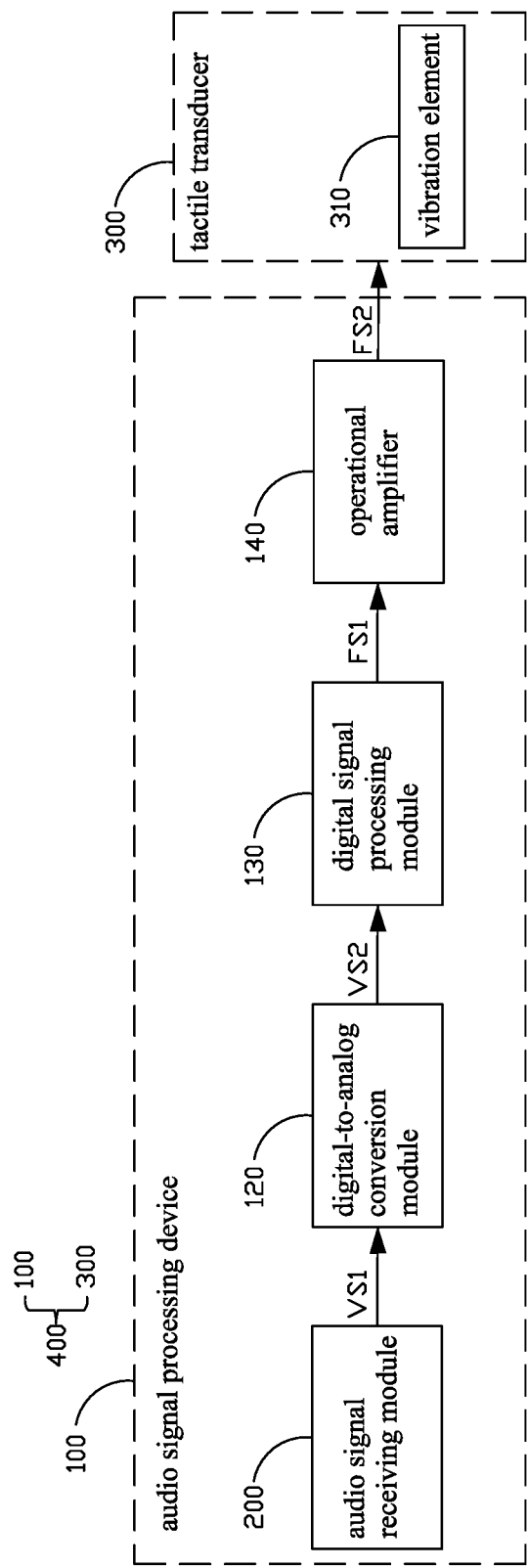
FIG. 1 is a block diagram of a somatosensory vibration generating device according to a first embodied configuration of the invention.

Please refer to FIG. 1 to FIG. 4. As shown in FIG. 1, a somatosensory vibration generating device of a first embodied configuration of the invention at least comprises an audio signal processing device 100 and a tactile transducer 300; wherein, the audio signal processing device 100 at least comprises an audio signal receiving module 200, a digital-to-analog conversion module 120, a digital signal processing module 130, and an operational amplifier 140; in addition, the tactile transducer 300 at least comprises one vibration element 310.

Figure 2A:
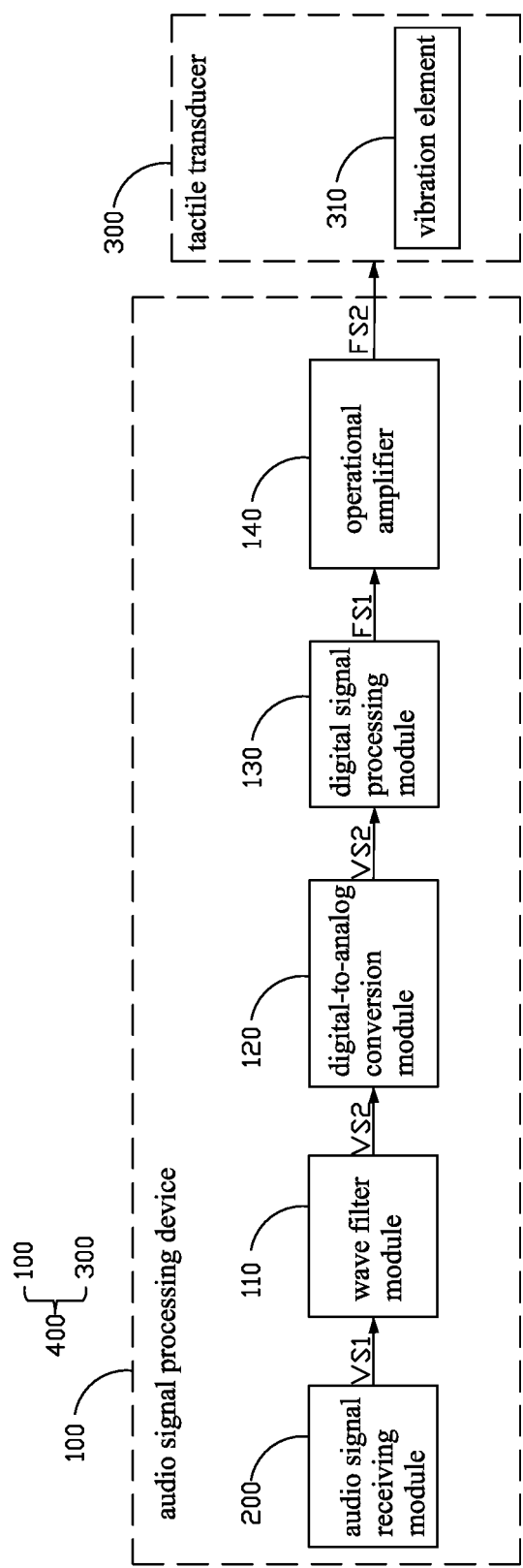
FIG. 2A is a block diagram of the somatosensory vibration generating device according to a second embodied configuration of the invention.
Figure 2B:
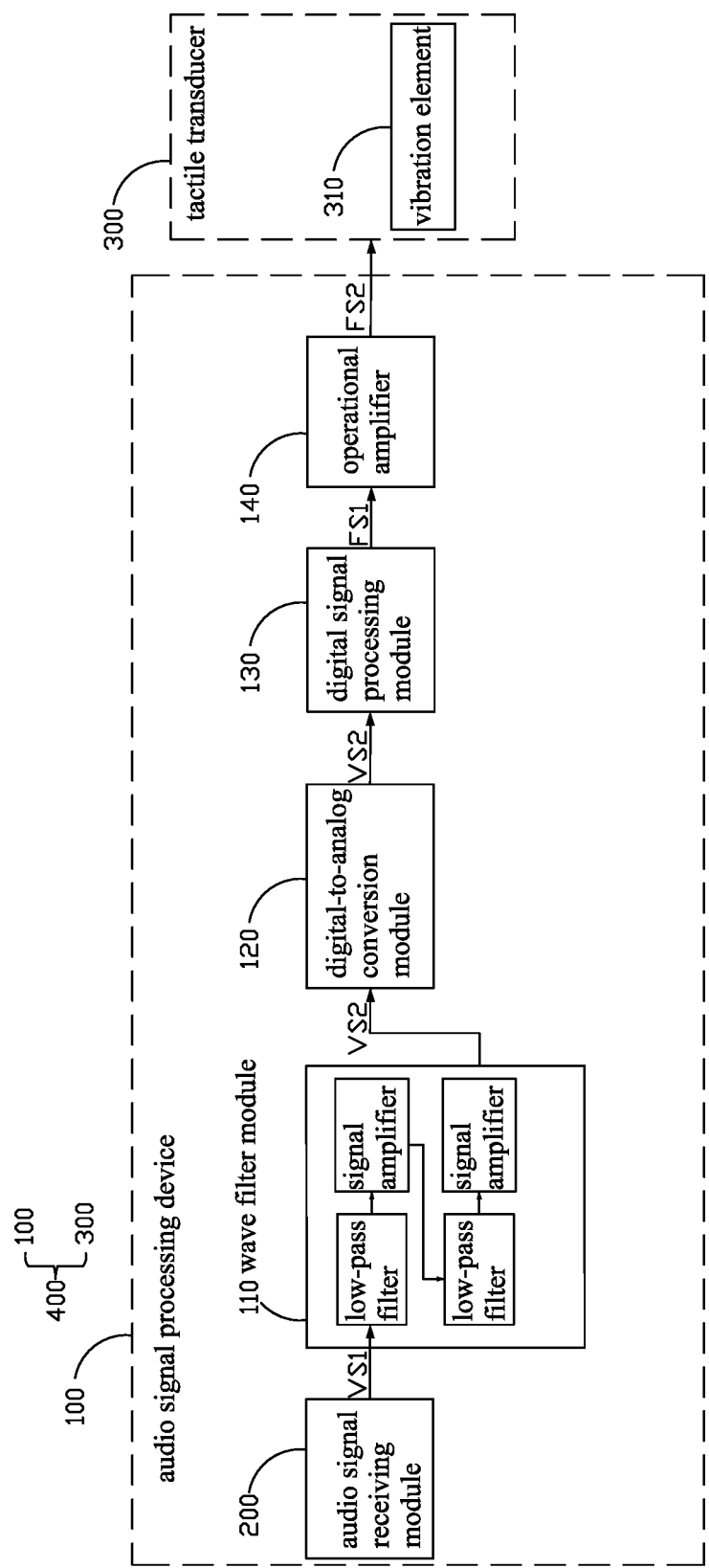
FIG. 2B is a block diagram of another example of the somatosensory vibration generating device according to the second embodied configuration of the invention.

Furthermore, as shown in FIGS. 2A and 2B, the somatosensory vibration generating device of a second embodied configuration of the invention at least comprises the audio signal processing device 100 and the tactile transducer 300; wherein, the audio signal processing device 100 at least comprises one wave filter module 110, the audio signal receiving module 200, the digital-to-analog conversion module 120, the digital signal processing module 130, and the operational amplifier 140; in addition, the tactile transducer 300 at least comprises the vibration element 310.

Figure 3:
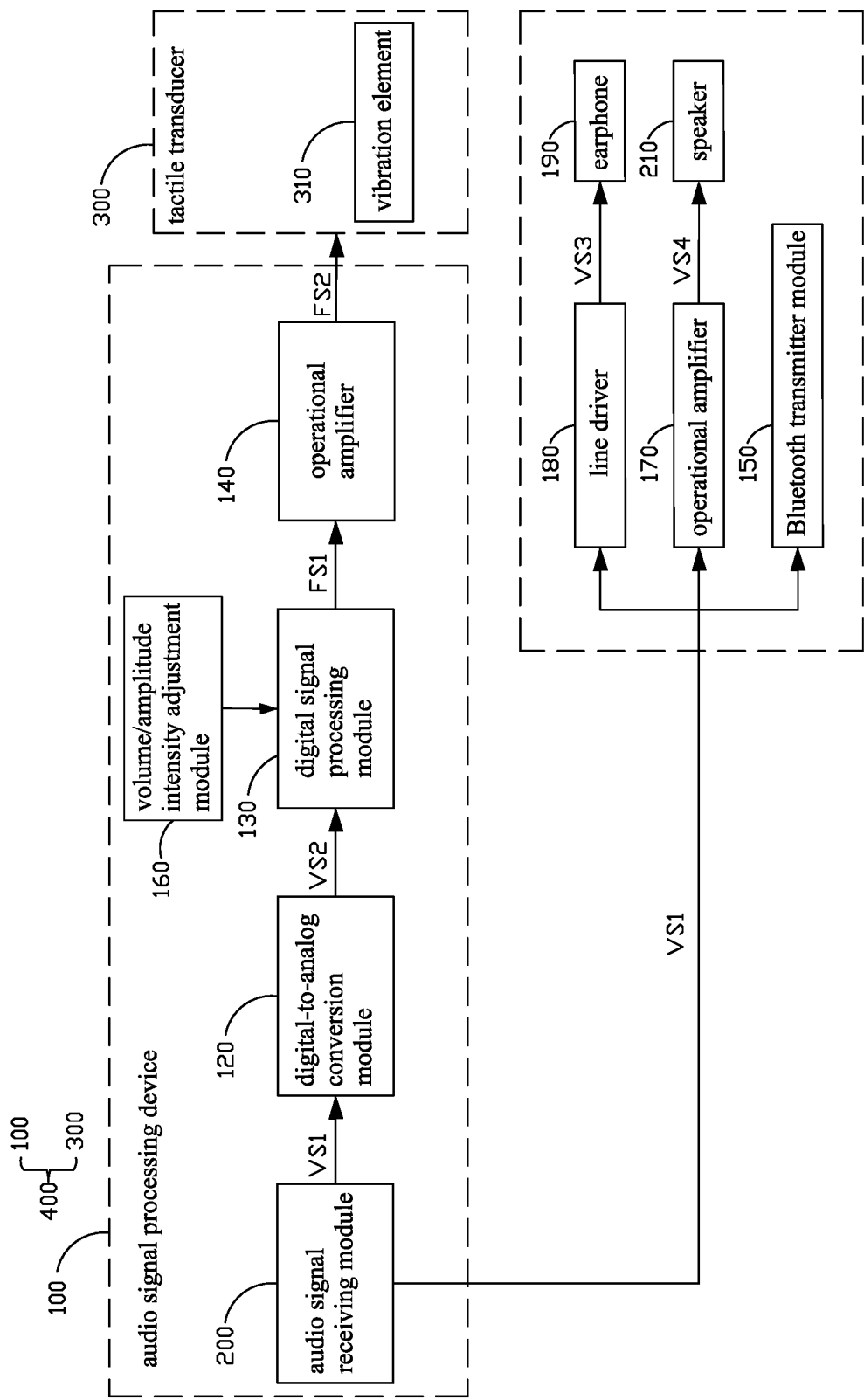
FIG. 3 is a block diagram of the somatosensory vibration generating device according to a third embodied configuration of the invention.

As shown in FIG. 3, the somatosensory vibration generating device of a third embodied configuration of the invention at least comprises the audio signal processing device 100 and the tactile transducer 300; wherein, the audio signal processing device 100 at least comprises the audio signal receiving module 200, the digital-to-analog conversion module 120, the digital signal processing module 130, a Bluetooth transmitter module 150, a volume/amplitude intensity adjustment module 160, the operational amplifier 140, an operational amplifier 170, a line driver 180, an earphone 190, and a speaker 210; in addition, the tactile transducer 300 at least comprises the vibration element 310.

Figure 4:
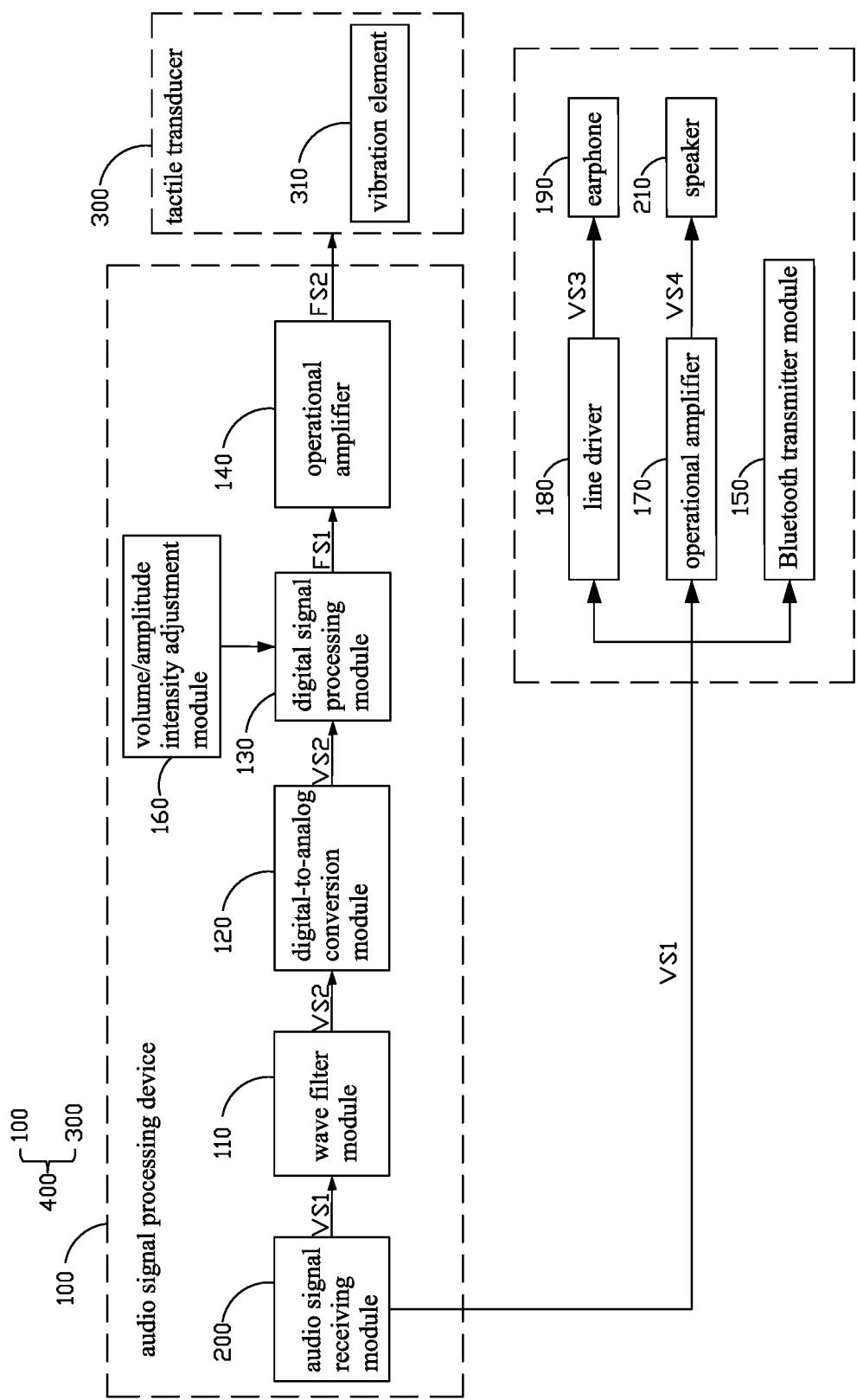
FIG. 4 is a block diagram of the somatosensory vibration generating device according to a fourth embodied configuration of the invention.

Furthermore, as shown in FIG. 4, a somatosensory vibration generating device 400 of a fourth embodied configuration of the invention at least comprises the audio signal processing device 100 and the tactile transducer 300; wherein, the audio signal processing device 100 at least comprises the wave filter module 110, the audio signal receiving module 200, the digital-to-analog conversion module 120, the digital signal processing module 130, the Bluetooth transmitter module 150, the volume/amplitude intensity adjustment module 160, the operational amplifier 140, the operational amplifier 170, the line driver 180, the earphone 190, and the speaker 210; in addition, the tactile transducer 300 at least comprises the vibration element 310.

Furthermore, according to one technical idea of the invention, in the third and fourth embodied configurations of the invention, a first audio frequency signal VS1 is processed by the digital-to-analog conversion module 120 and then further processed by the line driver 180 to generate a third audio frequency signal VS3; then the third audio frequency signal VS3 is output through the earphone 190. In addition, after the first audio frequency signal VS1 is processed by the digital-to-analog conversion module 120, the first audio frequency signal VS1 can be further processed by the operational amplifier 170 to generate a fourth audio frequency signal VS4; then the fourth audio frequency signal VS4 is output through the speaker 210.

In addition, according to one technical idea of the invention, in the somatosensory vibration generating device 400 of the third and fourth embodied configurations of the invention, the operational amplifier 170, the line driver 180, the earphone 190, and the speaker 210 are not required to be independent elements separately disposed, at least two of them can be combined and integrated into a functional element as required by conditions, for example, the operational amplifier 170, the line driver 180, the earphone 190, and the speaker 210 can be integrated into an audio signal output unit 500.

In addition, according to one technical idea of the invention, in the second and fourth embodied configurations of the invention, the wave filter module 110 is not particularly limited, as required by conditions, for example, as shown in FIG. 2B, the wave filter module 110 can comprise at least one low-pass filter, and at least one signal amplifier. For example, the wave filter module 110 can also comprise a first low-pass filter, a first signal amplifier, a second low-pass filter, and a second signal amplifier in sequence.

In addition, according to one technical idea of the invention, the audio signal processing device 100 of the first, second, third, and fourth embodied configurations of the invention is mainly used to synchronously convert the first audio frequency signal VS1 from an external environment into an audio frequency signal, a somatosensory vibration signal. In the invention, the first audio frequency signal VS1 refers to external environmental sounds or sound waves. For example, the first audio frequency signal VS1 can be an audio frequency signal received by, such as a wired microphone, a wireless microphone, a Bluetooth headset microphone, or any radio receiver device, or any audio signal processing device with microphone function.

In addition, according to one technical idea of the invention, in the audio signal processing device 100 of the first, second, third, and fourth embodied configurations of the invention, the digital-to-analog conversion module 120 is used for performing digital-to-analog conversion on the first audio frequency signal VS1 to generate and output a second audio frequency signal VS2 after digital-to-analog conversion. The digital-to-analog conversion module 120 performs digital-to-analog conversion on the first audio frequency signal VS1 by Fourier series arithmetic processing to remove harmonics and strengthen dominant waves. Secondly, a frequency of the second audio frequency signal VS2 obtained after digital-to-analog conversion performed by the digital-to-analog conversion module 120 is not particularly limited.

In addition, according to one technical idea of the invention, in the audio signal processing device 100 of the third and fourth embodied configurations of the invention, the digital-to-analog conversion module 120 is used to perform digital-to-analog conversion on the first audio frequency signal VS1, and then the first audio frequency signal VS1 is further transmitted to the digital signal processing module 130 via the volume/amplitude intensity adjustment module 160 as required by conditions. In addition, after the first audio frequency signal VS1 is converted from digital to analog by the digital-to-analog conversion module 120, the first audio frequency signal VS1 can be further transmitted to the earphone 190 via the line driver 180 as required by conditions; or can be further transmitted to the speaker 210 via the operational amplifier 170 as required by conditions.

Furthermore, according to one technical idea of the invention, in the audio signal processing device 100 of the first, second, third, and fourth embodied configurations of the invention, the digital signal processing module 130 is electrically connected to the digital-to-analog conversion module 120, and is used to convert the second audio frequency signal VS2 output by the digital-to-analog conversion module 120 into a first vibration signal FS1. The operational amplifier 140 is electrically connected to the digital signal processing module 130, and is used for performing gain processing on the first vibration signal FS1 and outputting a second vibration signal FS2 after gain processing.

Furthermore, according to one technical idea of the invention, in the audio signal processing device 100 of the third and fourth embodied configurations of the invention, the volume/amplitude intensity adjustment module 160 is electrically connected to the digital-to-analog conversion module 120, and it is used to activate the audio signal receiving module 200 in response to a boot signal OS generated by booting the audio signal processing device 100. In addition, the volume/amplitude intensity adjustment module 160 can also comprise a time control circuit, a gain control circuit, and a vibration control circuit as required by conditions.

In addition, according to one technical idea of the invention, the somatosensory vibration generating device 400 of the invention can further comprise a time control circuit for performing a timing operation to correspondingly generate at least one time signal; a gain control circuit electrically connected to the time control circuit, and used for receiving the time signal from the time control circuit and transmitting a gain control signal to the operational amplifier 170; and a vibration control circuit electrically connected to the time control circuit and the gain control circuit, and used for receiving the time signal from the time control circuit, and receiving a first vibration control signal from the gain control circuit and outputting the first vibration control signal.

Furthermore, according to one technical idea of the invention, in the first, second, third, and fourth embodied configurations of the invention, the audio signal receiving module 200 in the audio signal processing device 100 is not particularly limited, wherein the audio signal receiving module 200 further comprises any form of wired or wireless input source, for example, it can be a microphone or a Bluetooth, but it is not limited thereto.

In addition, according to one technical idea of the invention, in the somatosensory vibration generating device 400 of the first, second, third, and fourth embodied configurations of the invention, the tactile transducer 300 can at least comprise the vibration element 310 as required by conditions.

Furthermore, in one embodiment, when the somatosensory vibration generating device 400 of the invention directly or indirectly receives the first audio frequency signal VS1, the somatosensory vibration generating device 400 first performs one time or more than one time of filtering and signal amplifying and reforming on the first audio frequency signal VS1, and according to set function requirements intercepts any frequency band below 200 Hz as a signal source, and the digital-to-analog conversion module 120 uses Fourier series as a frequency domain to spread the reformed first audio frequency signal VS1 or the first audio frequency signal VS1 generated by external sound waves, and eliminates harmonics of third-order and above third-order to obtain the second audio frequency signal VS2 with highlighted dominant wave bands; the second audio frequency signal VS2 is converted into the first vibration signal FS1 through the digital signal processing module 130; then the operational amplifier 140 amplifies the first audio frequency signal VS1 into the second vibration signal FS2, after the second vibration signal FS2 is transmitted to the tactile transducer 300 based on a time signal TS received from a time control circuit 111 of the volume/amplitude intensity adjustment module 160, and then according to the second vibration signal FS2 the vibration element 310 of the tactile transducer 300 generates a somatosensory vibration synchronized with external environmental sounds based on the time signal TS received by the time control circuit 111 of the volume/amplitude intensity adjustment module 160.

Furthermore, in another embodiment, the somatosensory vibration generating device 400 of the invention first uses the audio signal receiving module 200 to receive a sound wave and then generates the first audio frequency signal VS1, or directly receives the first audio frequency signal VS1, and transmits the first audio frequency signal VS1 to the digital-to-analog conversion module 120; then, the first audio frequency signal VS1 is optimized by Fourier operations through the digital signal processing module 130, for example, to eliminate harmonics and perform dominant waveform gain amplification, and frequency bands with a frequency lower than 200 Hz are intercepted as the second audio frequency signal VS2; the second audio frequency signal VS2 is converted into the first vibration signal FS1 through the digital signal processing module 130; then the first audio frequency signal VS1 is amplified by the operational amplifier 140 into the second vibration signal FS2, after the second vibration signal FS2 is transmitted to the tactile transducer 300 based on the time signal TS received from the time control circuit 111 of the volume/amplitude intensity adjustment module 160, and then according to the second vibration signal FS2 the vibration element 310 of the tactile transducer 300 generates a somatosensory vibration synchronized with external environmental sounds based on the time signal TS received by the time control circuit 111 of the volume/amplitude intensity adjustment module 160.

In addition, according to one technical idea of the invention, the somatosensory vibration generating device 400 of the invention can further comprise, for example, a wired or wireless Bluetooth input source, AUX auxiliary input source, at least any one of combinations of the above, but it is not limited thereto.

In addition, in other embodiments, the somatosensory vibration generating device 400 of the invention can further utilize the Bluetooth transmitter module 150 to transmit the first audio frequency signal VS1 to an external broadcasting equipment, such as Bluetooth headset, Bluetooth audio equipment. More specifically, for example, the Bluetooth transmitter module 150 is a Bluetooth transmitter and is provided with 4 ports that can be respectively used to output audio signals, communicatively connect to a LED display, and set for frequency signals. A user can connect to external electronic devices, such as Bluetooth headset or Bluetooth audio equipment and amplifier, through the Bluetooth transmitter module 150.

In addition, the somatosensory vibration generating device 400 of the invention can be manufactured as a fixed device or a mobile device or a wearable device to be disposed on an object or an object with an accommodating space. For example, the somatosensory vibration generating device 400 of the invention can be manufactured as a portable wearable device to be disposed on a belt-like object such as a waist belt, a shoulder strap; or can be manufactured as a portable wearable device to be disposed between two belt-like objects such as a waist belt, a shoulder strap; or a buckle comprising a snap ring and a fastener can be further provided on the aforementioned portable wearable device such as a waist belt, a shoulder strap.

In addition, the somatosensory vibration generating device 400 of the invention can be further provided with a power supply unit that can be charged with an external electric power. For example, the power supply unit can be a rechargeable battery, such as a lithium battery, but it is not limited thereto.

In addition, the audio signal processing device 100 and the somatosensory vibration generating device 400 of the invention can be implemented in a way as follows, for example, in concerts, movie theaters, and e-sports games, the user receives sound waves of peripheral audio signals through a microphone disposed inside the wearable device, the sound waves of audio signals are transmitted to the wearable device equipped with at least one of the somatosensory vibration generating device 400 and the audio signal processing device 100 of the invention, for example, the wearable device is worn on a body of the user or the music listener, and the tactile transducer 300 is attached to a surface of the skin of the user or the music listener, when audio signals are received, at least one of the somatosensory vibration generating device 400 and the audio signal processing device 100 is used to amplify the sound and convert it into a vibration wave for outputting after digital-to-analog conversion, or the audio signals are converted into frequency vibration signals, then, the body of the user or the music listener is vibrated at bass frequency of the audio signals caused by vibration of the tactile transducer 300.

Figure 5:
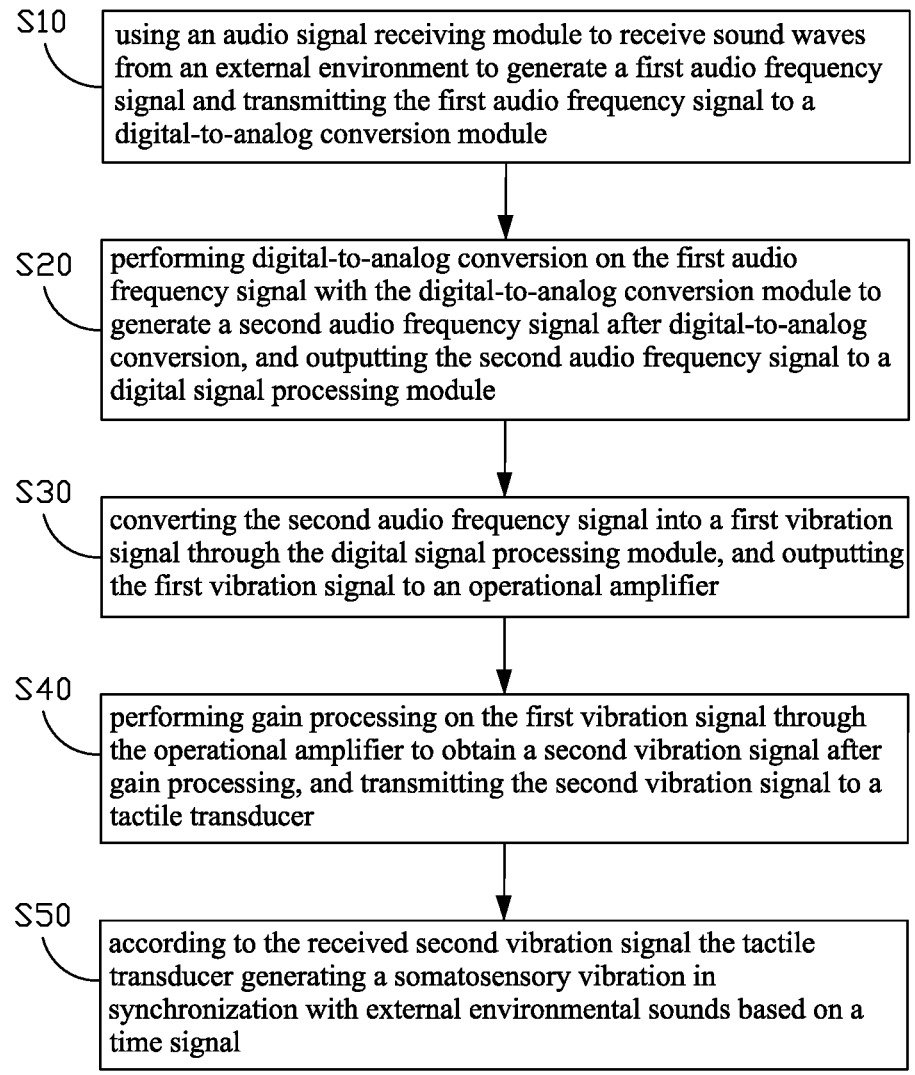
FIG. 5 is a flow chart of a method for forming somatosensory vibration according to an embodied configuration of the invention.

Next, please refer to FIG. 5. FIG. 5 is a flow chart of implementation steps of a method for forming somatosensory vibration according to an embodied configuration of the invention. As shown in FIG. 5, the implementation steps of the method for forming somatosensory vibration of the invention comprise:

step S10: using an audio signal receiving module to receive sound waves from an external environment to generate a first audio frequency signal and transmitting the first audio frequency signal to a digital-to-analog conversion module;

step S20: performing digital-to-analog conversion on the first audio frequency signal with the digital-to-analog conversion module to generate a second audio frequency signal after digital-to-analog conversion, and outputting the second audio frequency signal to a digital signal processing module;

step S30: converting the second audio frequency signal into a first vibration signal through the digital signal processing module, and outputting the first vibration signal to an operational amplifier;

step S40: performing gain processing on the first vibration signal through the operational amplifier to obtain a second vibration signal after gain processing, and transmitting the second vibration signal to a tactile transducer; and step S50: according to the received second vibration signal the tactile transducer generating a somatosensory vibration in synchronization with external environmental sounds based on a time signal.

As shown in steps S10 to S50, the method for forming somatosensory vibration according to an embodied configuration of the invention is capable of receiving sounds of an external environment and converting the sounds into a somatosensory vibration.

In step S10, the audio signal receiving module 200 receives sound waves of an external environment to generate the first audio frequency signal VS1 and transmits the first audio frequency signal VS1 to the digital-to-analog conversion module 120. In addition, after the volume/amplitude intensity adjustment module 160 detects or receives, for example, the boot signal OS that turns on a power of the audio signal receiving module 200, each of the control circuits immediately responds to the boot signal OS to generate corresponding control signals and trigger various subsequent operations. For example, the boot signal OS can be, such as a voltage signal, but it is not limited thereto.

In some embodiments, the above-mentioned control signals can comprise at least one time signal correspondingly generated by the time control circuit 111 performing a timing operation. Specifically, for example, the time control circuit 111 uses a timer to perform a timing operation and obtains at least one time signal TS, such as, TS0, TS1, TS2, TS3, TS4, etc., generated by the audio signal processing device 100 from an elapsed time since the audio signal processing device 100 is turned on.

Secondly, in step S20, the digital-to-analog conversion module 120 performs digital-to-analog conversion on the first audio frequency signal VS1 to generate the second audio frequency signal VS2 after digital-to-analog conversion, and outputs the second audio frequency signal VS2 to the digital signal processing module 130. Specifically, in some embodiments, the somatosensory vibration generating device 400 or the audio signal processing device 100 of the invention is used.

Then, in step S30, the second audio frequency signal VS2 is converted into the first vibration signal FS1 through the digital signal processing module 130, and the first vibration signal FS1 is output to the operational amplifier 140.

Then, in step S40, the operational amplifier 140 performs gain processing on the first vibration signal FS1 to obtain the second vibration signal FS2 after gain processing, and transmits the second vibration signal FS2 to the tactile transducer 300. In addition, in step S40, the operational amplifier 140 can also perform gain processing on the first vibration signal FS1 according to a gain value set in advance or calculated by algorithm to generate the second vibration signal FS2. In addition, the above-mentioned gain value can be any value that is capable of achieving signal gain effect; the gain value can be a discontinuously increasing added value; can be a continuously changing added value; can also be a disorderly increasing added value.

Finally, in step S50, according to the received second vibration signal FS2 the tactile transducer 300 causes the vibration element 310 to generate a somatosensory vibration synchronized with external environmental sounds based on the time signal TS. Secondly, the somatosensory vibration can be transmitted to a body surface of a human body through output, so that the user can feel the corresponding vibration waves transmitted into the body along with the rhythm of the music, and also stereo sound amplification of music can be achieved through a built-in loudspeaker element on the wearable device, or audio signals can be wirelessly transmitted into the earphone 190 via a wireless transmitting element, or audio signals can be wired transmitted into the earphone 190 via AUX auxiliary output.

In addition, the somatosensory vibration generating device 400 of the invention can also comprise the audio signal receiving modules 200, for example, comprising a first audio signal receiving module for receiving sound waves in a first direction to generate a first audio frequency signal, and a second audio signal receiving module for receiving sound waves in a second direction to generate a second audio frequency signal. For example, in some embodiments, the first audio signal receiving module can be used to receive sound waves from the right side of the user, and the second audio signal receiving module can be used to receive sound waves from the left side of the user.

On the other hand, the somatosensory vibration generating device 400 of the invention can also comprise the tactile transducers 300; for example, comprising a first tactile transducer worn on the right side of the user's body to be capable of generating a somatosensory vibration corresponding to the first vibration signal FS1 generated by the first audio signal receiving module, and a second tactile transducer worn on the left side of the user's body to be capable of generating a somatosensory vibration corresponding to the second vibration signal FS2 generated by the second audio signal receiving module. Since sound waves on the left and right sides of the user may be different, the tactile transducers 300 worn on the left and right sides of the user may generate vibrations of different frequencies or amplitudes, resulting in different somatosenses.

Therefore, by using the audio signal processing device 100, the somatosensory vibration generating device 400, and the method for forming somatosensory vibration of the invention, the user is capable of synchronously sensing the somatosensory vibration corresponding to the music and sent by the tactile transducer 300 while listening to stereo music, watching movies, or engaging in electronic games, thereby enjoying the effects of immersive and on-site synchronized somatosensory vibration.

Therefore, the audio signal processing device, the somatosensory vibration generating device, and the method for forming somatosensory vibration of the invention are essentially novel, non-obvious, and usable for industrial use, and fully meet the statutory requirements for patent that should be granted.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A somatosensory vibration generating device comprising:
   an audio signal receiving module receiving sound waves of external environmental sounds and converting the sound waves into a first audio frequency signal;
   a digital-to-analog conversion module electrically connected to the audio signal receiving module and used for performing digital-to-analog conversion on the first audio frequency signal to generate and output a second audio frequency signal after digital-to-analog conversion;
   a digital signal processing module electrically connected to the digital-to-analog conversion module and used for converting the second audio frequency signal output by the digital-to-analog conversion module into a first vibration signal;
   an operational amplifier electrically connected to the digital signal processing module and used for performing gain processing on the first vibration signal and outputting a second vibration signal after gain processing; and
   at least one tactile transducer electrically connected to the operational amplifier and at least comprising a vibration element and a tactile transducer; wherein
   the vibration element is used for receiving the second vibration signal and causing the vibrating element to generate a somatosensory vibration in synchronization with external environmental sounds according to the second vibration signal.

2. The somatosensory vibration generating device as claimed in claim 1, further comprising a volume/amplitude intensity adjustment module electrically connected to the digital signal processing module and used for adjusting audio signals of the volume/amplitude intensity adjustment module.

3. The somatosensory vibration generating device as claimed in claim 1, further comprising a wave filter module electrically connected to the digital-to-analog conversion module, the wave filter module comprising at least one low-pass filter, and at least one signal amplifier.

4. The somatosensory vibration generating device as claimed in claim 1, further comprising a line driver and an earphone, and/or an operational amplifier and a speaker.

5. The somatosensory vibration generating device as claimed in claim 2, wherein the audio signal receiving module, the digital-to-analog conversion module, the operational amplifier, and the volume/amplitude intensity adjustment module are separately disposed or integratively disposed on a main control circuit board.

6. The somatosensory vibration generating device as claimed in claim 1, further comprising a Bluetooth transmitter module for wirelessly outputting audio frequency signals to Bluetooth headphones, Bluetooth audio equipment and speakers.

7. The somatosensory vibration generating device as claimed in claim 2, further comprising a wearing part for disposing the audio signal receiving module, the digital-to-analog conversion module, the operational amplifier, the vibration element, the volume/amplitude intensity adjustment module and the at least one tactile transducer, and being suitable to wear or equip on a human body.

8. The somatosensory vibration generating device as claimed in claim 2, further comprising a fixed device for disposing the audio signal receiving module, the digital-to-analog conversion module, the operational amplifier, the vibration element, the volume/amplitude intensity adjustment module and the at least one tactile transducer.

9. The somatosensory vibration generating device as claimed in claim 1, wherein the audio signal receiving module further comprises at least one selected from MEMS microphone, MEMS microphone array, capacitive microphone, Bluetooth input source, AUX auxiliary input source, and wired input source.

10. A method for forming somatosensory vibration comprising steps of:
using an audio signal receiving module to receive sound waves from an external environment to generate a first audio frequency signal and transmitting the first audio frequency signal to a digital-to-analog conversion module;
performing digital-to-analog conversion on the first audio frequency signal with the digital-to-analog conversion module to generate a second audio frequency signal after digital-to-analog conversion, and outputting the second audio frequency signal to a digital signal processing module;
converting the second audio frequency signal into a first vibration signal through the digital signal processing module, and outputting the first audio frequency signal to an operational amplifier;
performing gain processing on the first vibration signal through the operational amplifier to obtain a second vibration signal after gain processing, and transmitting the second vibration signal to a tactile transducer; and
the tactile transducer generating a somatosensory vibration in synchronization with external environmental sounds according to the received second vibration signal; wherein
the digital signal processing module optimizes the first audio frequency signal by Fourier series arithmetic processing to remove harmonics and strengthen dominant wave gain;
a frequency of the second audio frequency signal is less than 200 Hz.

\* \* \* \* \*